(12) United States Patent
Matsuda et al.

(10) Patent No.: US 6,191,226 B1
(45) Date of Patent: Feb. 20, 2001

(54) POLYBUTADIENE RUBBER AND IMPACT-RESISTANT AROMATIC VINYL RESIN COMPOSITIONS

(75) Inventors: Hiroaki Matsuda; Kohkichi Noguchi, both of Kawasaki (JP)

(73) Assignee: Nippon Zeon Co., Ltd., Tokyo (JP)

( * ) Notice: Under 35 U.S.C. 154(b), the term of this patent shall be extended for 0 days.

(21) Appl. No.: 09/242,617

(22) PCT Filed: Aug. 20, 1997

(86) PCT No.: PCT/JP97/02885

§ 371 Date: Feb. 19, 1999

§ 102(e) Date: Feb. 19, 1999

(87) PCT Pub. No.: WO98/07783

PCT Pub. Date: Feb. 26, 1998

(30) Foreign Application Priority Data

Aug. 21, 1996 (JP) .................................................. 8-238471

(51) Int. Cl.$^7$ ....................................................... C08L 9/00
(52) U.S. Cl. ............................ 525/236; 525/84; 525/243; 525/316
(58) Field of Search .............................. 525/84, 197, 236, 525/243, 316

(56) References Cited

U.S. PATENT DOCUMENTS 4,537,936 * 8/1985 Takao et al. ........................ 525/236
4,990,569 * 2/1991 Okamoto et al. ................. 525/236 X
5,508,336   4/1996 Takeichi et al. ...................... 524/496
5,959,039 * 9/1999 Yokoyama et al. .................. 525/236

FOREIGN PATENT DOCUMENTS

| 4-14689 | 3/1992 | (JP) . |
| 5-070628 | 3/1993 | (JP) . |
| 6-55856 | 7/1994 | (JP) . |
| 7-5789 | 1/1995 | (JP) . |
| 7-233285 | 9/1995 | (JP) . |

* cited by examiner

*Primary Examiner*—Fred Teskin
(74) *Attorney, Agent, or Firm*—Armstrong, Westerman, Hattori, McLeland & Naughton

(57) ABSTRACT

The invention relates to polybutadiene rubber wherein a molecular weight distribution curve of the rubber as determined by gel permeation chromatography (GPC) has 2 peaks attributable to a high molecular weight component and a low molecular weight component, a peak top molecular weight of the high molecular weight component and a peak top molecular weight of the low molecular weight component fall within ranges of from 100,000 to 1,500,000 and from 10,000 to 50,000, respectively, a ratio of the weight average molecular weight (Mw) to the number average molecular weight (Mn), Mw/Mn, falls within a range of from 4.5 to 14.5, and the content of a cis-1,4 structure is at least 80 wt. %, a high-impact aromatic vinyl resin composition comprising the polybutadiene rubber, and a preparation process of the resin composition.

21 Claims, No Drawings

POLYBUTADIENE RUBBER AND IMPACT-RESISTANT AROMATIC VINYL RESIN COMPOSITIONS

TECHNICAL FIELD

The present invention relates to novel polybutadiene rubber, a high-impact aromatic vinyl resin composition comprising such polybutadiene rubber, and a preparation process of the resin composition.

BACKGROUND ART

High-impact polystyrene (HIPS) resins are generally produced by subjecting a styrene monomer to bulk polymerization, solution polymerization or bulk-suspension polymerization in the presence of any of various kinds of unvulcanized rubber and have a structure that rubber particles are dispersed in a matrix of a polystyrene resin, whereby the impact resistance of the polystyrene resin, which is rigid and brittle, is markedly improved. Since the high-impact polystyrene resins are cheap and excellent in processability and various physical properties, they have been used in wide application fields.

Polybutadiene rubber and styrene-butadiene copolymer rubber are generally used as the unvulcanized rubber for the high-impact polystyrene resins. In the case where high impact resistance at a low temperature is particularly required, various kinds of polybutadiene rubber are in use. More specifically, for example, the so-called low-cis-polybutadiene rubber obtained by anionic polymerization making use of a catalyst composed of an organolithium alone or comprising the organolithium as a main component, or the so-called high-cis-polybutadiene rubber obtained by using an anionic coordination catalyst comprising a compound of a transition metal such as cobalt, nickel or titanium as a main component is in use.

In recent years, the high-impact polystyrene resins have shown a tendency to be used in wider application fields because of their good various physical properties and processability. As the high-impact polystyrene resins are used in wider application fields, the performance characteristics required of the resins become higher than before. With respect to the physical properties, there is a demand for improvements in balance between impact resistance and stiffness (modulus in flexure), low-temperature impact resistance, and appearance such as gloss. The high-impact polystyrene resins obtained by polymerizing a styrene monomer in the presence of unvulcanized rubber are also required not to deteriorate their physical properties or scarcely deteriorate the physical properties even when the resins are used after they are further diluted with a polystyrene resin or the like or compounded with various kinds of additives such as a flame retardant.

As a method for more improving the low-temperature impact resistance, it has heretofore been proposed in Japanese Patent Publication No. 14689/1992 to prepare polybutadiene rubber having an extremely low 1,2-vinyl bond content and a narrow molecular weight distribution using a special catalyst comprising a rare earth metal compound as a main component and use the polybutadiene rubber thus obtained as an impact modifier. According to this method, a high-impact polystyrene resin excellent in resistance to heat deterioration and weather resistance can be obtained. However, its improving effect on low-temperature impact resistance is not yet sufficient, and its improving effects on stiffness and impact resistance are also not satisfactory.

Japanese Patent Publication No. 5789/1995 has proposed a method of producing a high-impact polystyrene resin improved in impact resistance and gloss, in which a blend of polybutadiene rubber having a high intrinsic viscosity and polybutadiene rubber having a somewhat lower intrinsic viscosity is used as an impact modifier. According to this method, the improving effects on impact resistance and gloss can be brought about. However, since the molecular weight of a low molecular weight component in the blend is high, and the molecular weight distribution thereof is narrow, the impact resistance of the resulting polystyrene resin is not sufficient, and the impact resistance is more markedly deteriorated when the resin is used after diluted with a polystyrene resin or the like or compounded with various kinds of additives.

DISCLOSURE OF THE INVENTION

It is an object of the present invention to provide a high-impact aromatic vinyl resin composition which is well balanced between impact resistance and stiffness (modulus in flexure), has good low-temperature impact resistance and is prevented from being deteriorated in physical properties by dilution with an aromatic vinyl resin or compounding of various kinds of additives, and novel polybutadiene rubber which permits the provision of such a resin composition.

The present inventors have carried out an extensive investigation with a view toward solving the above-described problems involved in the prior art. As a result, it has been found that when polybutadiene rubber, wherein:

(1) a molecular weight distribution curve of the rubber as determined by gel permeation chromatography (GPC) has 2 peaks attributable to a high molecular weight component and a low molecular weight component, (2) a molecular weight corresponding to a top of the peak (hereinafter referred to as "peak top molecular weight") of the high molecular weight component and a peak top molecular weight of the low molecular weight component fall within ranges of from 100,000 to 1,500,000 and from 10,000 to 50,000, respectively, (3) a ratio of the weight average molecular weight (Mw) to the number average molecular weight (Mn), Mw/Mn, falls within a range of from 4.5 to 14.5, and (4) the content of a cis-1,4 structure is at least 80 wt. %, is used as a rubber component in a high-impact polystyrene resin, a high-impact aromatic vinyl resin composition, which is well balanced between impact resistance and stiffness (modulus in flexure), has good low-temperature impact resistance (low-temperature impact strength) and is prevented from being deteriorated in physical properties by dilution with an aromatic vinyl resin or compounding of various kinds of additives, can be obtained. The present invention has been led to completion on the basis of this finding.

According to the present invention, there is thus provided polybutadiene rubber wherein a molecular weight distribution curve of the rubber as determined by gel permeation chromatography (GPC) has 2 peaks attributable to a high molecular weight component and a low molecular weight component, a peak top molecular weight of the high molecular weight component and a peak top molecular weight of the low molecular weight component fall within ranges of from 100,000 to 1,500,000 and from 10,000 to 50,000, respectively, a ratio of the weight average molecular weight (Mw) to the number average molecular weight (Mn), Mw/Mn, falls within a range of from 4.5 to 14.5, and the content of a cis-1,4 structure is at least 80 wt. %.

According to the present invention, there is also provided a process for preparing a high-impact aromatic vinyl resin composition, which comprises radical-polymerizing 99 to 60 wt. % of (B) an aromatic vinyl monomer or a mixture of the aromatic vinyl monomer and a monomer copolymerizable therewith in the presence of 1 to 40 wt. % of (A) the above-described polybutadiene rubber.

According to the present invention, there is further provided a high-impact aromatic vinyl resin composition having a structure that polybutadiene rubber is dispersed in a matrix of an aromatic vinyl resin, wherein:

(a) the polybutadiene rubber is the above-described polybutadiene rubber, (b) the aromatic vinyl resin is at least one selected from the group consisting of polymers of aromatic vinyl monomers and copolymers of an aromatic vinyl monomer and a monomer copolymerizable therewith, (c) proportions of the polybutadiene rubber and the aromatic vinyl resin are 1 to 40 wt. % and 99 to 60 wt. %, respectively, and (d) the polybutadiene rubber is dispersed in the form of rubber particles having an average particle diameter ranging from 0.01 to 10 μm in the aromatic vinyl resin.

BEST MODE FOR CARRYING OUT THE INVENTION

Polybutadiene Rubber:

In the present invention, polybutadiene rubber having specific physical properties, structure and composition is used as a toughening agent in the high-impact aromatic vinyl resin composition. More specifically, the polybutadiene rubber useful in the practice of the present invention is rubber defined by the following features.

(1) A molecular weight distribution curve of the rubber as determined by GPC is the so-called two-peak molecular weight distribution curve having 2 peaks attributable to a high molecular weight component and a low molecular weight component.

(2) A peak top molecular weight of the high molecular weight component and a peak top molecular weight of the low molecular weight component fall within ranges of from 100,000 to 1,500,000 and from 10,000 to 50,000, respectively.

(3) A ratio of the weight average molecular weight (Mw) to the number average molecular weight (Mn), Mw/Mn, falls within a range of from 4.5 to 14.5.

(4) The content of a cis-1,4 structure is at least 80 wt. %.

In addition, the polybutadiene rubber used in the present invention preferably has such physical properties, structure and composition as described below.

(5) An intrinsic viscosity [η] as measured at 30° C. in a toluene solution falls within a range of from 1.0 to 6.0.

(6) Proportions of the high molecular weight component and low molecular weight component contained in the polybutadiene rubber are 30 to 98 wt. % and 2 to 70 wt. %, respectively.

The polybutadiene rubber used in the present invention has 2 peaks on its molecular weight distribution curve as determined by GPC. In the molecular weight distribution curve of the rubber as determined by GPC, the peak top molecular weight of the high molecular weight component and the peak top molecular weight of the low molecular weight component must fall within ranges of from 100,000 to 1,500,000 and from 10,000 to 50,000, respectively. In particular, the presence of the low molecular weight component permits the provision of a high-impact resin composition having excellent low-temperature impact resistance and markedly improved in stiffness. When polybutadiene rubber in which 2 peaks do not appear on its molecular weight distribution curve as determined by GPC is used, only a high-impact resin composition insufficient in low-temperature impact resistance and stiffness can be provided.

More specifically, the peak top molecular weight of the high molecular weight component in the polybutadiene rubber is within a range of from 100,000 to 1,500,000, preferably from 200,000 to 1,000,000, more preferably from 300,000 to 800,000. If the peak top molecular weight of the high molecular weight component is too high or too low, the improving effects of such polybutadiene rubber on impact resistance and stiffness become insufficient in any case. In addition, the improving effect on low-temperature impact resistance is also lowered. The peak top molecular weight of the low molecular weight component in the polybutadiene rubber is within a range of from 10,000 to 50,000, preferably from 13,000 to 40,000, more preferably from 15,000 to 30,000. If the peak top molecular weight of the low molecular weight component is too high or too low, the improving effects of such polybutadiene rubber on impact resistance and stiffness become insufficient in any case. In addition, the improving effect on low-temperature impact resistance is also lowered.

The molecular weight distribution (Mw/Mn) of the polybutadiene rubber used in the present invention is within a range of from 4.5 to 14.5, preferably from 5.0 to 14.0, more preferably from 6.0 to 13.5, most preferably from 8.0 to 13.0. If the molecular weight distribution of the polybutadiene rubber is extremely narrow, the stiffness and low-temperature impact resistance of a high-impact resin composition obtained by using such polybutadiene rubber become insufficient. In addition, the impact resistance of the resin composition is deteriorated to a great extent when it is diluted with an aromatic vinyl resin or the like or compounded with various kinds of additives. If the molecular weight distribution is extremely wide, the improving effect of such polybutadiene rubber on impact resistance is lowered, and the stiffness of the resulting resin composition is also lowered.

The content of a cis-1,4 structure (cis-1,4-bond content) in the polybutadiene rubber used in the present invention is at least 80 wt. %, preferably at least 85 wt. %, more preferably at least 90 wt. %. If the content of cis-1,4 structure in the polybutadiene rubber is too low, the improving effect of such polybutadiene rubber on low-temperature impact resistance is lowered.

No particular limitation is imposed on the microstructure of the residual part in the polybutadiene rubber. It is however preferred that the content of a 1,2-vinyl bond be generally 1 to 10 wt. %, preferably 1 to 5 wt. %, more preferably 2 to 4 wt. % because the physical properties, such as impact resistance, of the resulting resin composition become excellent.

The polybutadiene rubber used in the present invention preferably has an intrinsic viscosity [η] ranging from 1.0 to 6.0 as measured at 30° C. in a toluene solution. The intrinsic viscosity of the polybutadiene rubber is more preferably within a range of from 1.5 to 4.5, most preferably from 2.0 to 3.0. If polybutadiene rubber having an extremely low intrinsic viscosity is used as an impact modifier, the impact resistance of the resulting high-impact resin composition is lowered to a great extent when the composition is diluted with an aromatic vinyl resin or the like or compounded with various kinds of additives. If the intrinsic viscosity of the polybutadiene rubber is extremely high, it is difficult to disperse such polybutadiene rubber in the form of fine rubber particles in a matrix of the aromatic vinyl resin. As a result, it makes it difficult to provide a high-impact resin composition having excellent impact resistance and stiffness. In addition, the impact resistance of the resin composition is lowered to a great extent when the composition is diluted with an aromatic vinyl resin or the like or compounded with various kinds of additives.

In the polybutadiene rubber used in the present invention, the proportion of the high molecular weight component contained in the polybutadiene rubber is preferably 30 to 98 wt. %, more preferably 40 to 97 wt. %, most preferably 50 to 95 wt. %, while the proportion of the low molecular weight component is preferably 2 to 70 wt. %, more preferably 3 to 60 wt. %, most preferably 5 to 50 wt. %. When the proportions of these components contained in the rubber fall within the above respective ranges, a high-impact resin composition having excellent impact resistance, stiffness and low-temperature impact strength can be provided. In addition, the resin composition is prevented from being deteriorated in impact resistance even when it is diluted with an aromatic vinyl resin or the like or compounded with various kinds of additives.

The proportions of the high molecular weight component and low molecular weight component contained in the polybutadiene rubber can be determined on the basis of the compounding proportions of these components. However, they may be calculated out from a molecular weight distribution curve of the polybutadiene rubber as determined by GPC. More specifically, the proportions of the respective components contained in the polybutadiene rubber can be calculated out by a ratio of areas corresponding to 2 peaks, which are divided by a perpendicular from the lowest point (valley) between the two peaks on the molecular weight distribution curve as determined by GPC. In this case, since the ratio of the areas corresponding to the two peaks does not correspond to a weight ratio, the proportion of the high molecular weight component to the low molecular weight component falls within a range of preferably from 30:70 to 99:1, more preferably from 40:60 to 95:5, most preferably from 50:50 to 90:1 in terms of the ratio of the area (a) of the high molecular weight component to the area (b), a:b, of the low molecular weight component.

Preparation Process of Polybutadiene Rubber:

No particular limitation is imposed on the preparation process of the polybutadiene rubber according to the present invention. For example, polybutadiene rubbers corresponding to the high molecular weight component and low molecular weight component are separately produced, and both components are then blended with each other, whereby the impact modifier according to the present invention can be prepared. Each polybutadiene rubber can be generally produced by polymerizing 1,3-butadiene in an inert organic solvent using a polymerization catalyst system containing a transition metal compound, an organoaluminum compound and a polar compound. Upon the polymerization, a molecular weight modifier and an anti-gelling agent may be used as needed. The molecular weight of each polybutadiene rubber can be controlled by suitably adjusting the kind and amount of the catalyst used and the amount of the molecular weight modifier used.

No particular limitation is imposed on the transition metal compound used in the present invention so far as it contains a transition metal and is soluble in the polymerization solvent. However, a salt of a transition metal is generally used. The transition metal is defined as a metal element having an imperfect D or F subshell or a metal element which produces a cation having such a subshell. Examples of the transition metal generally include elements of the Groups 3 to 11 of the periodic table according to the IUPAC Inorganic Chemistry Nomenclature, revised edition (1989). Specific examples thereof include titanium, chromium, manganese, iron, cobalt, nickel, copper, yttrium, lanthanum and neodymium. Of these, iron, cobalt, nickel and neodymium are preferred, with cobalt and nickel being particularly preferred. Examples of the salt include organic acid salts and organic complexes. No particular limitation is imposed on the number of carbon atoms in the organic salts and organic complexes. However, the number of carbon atoms is generally within a range of from 1 to 80, preferably from 2 to 25, more preferably from 3 to 20. These transition metal compounds may be used either singly or in any combination thereof.

As the organoaluminum compound, there may be used a compound represented by the formula, $AlR_{3-n}X_n$. In the formula, R groups are independently selected from alkyl groups, aryl group and cycloalkyl groups, and preferably alkyl groups. No particular limitation is imposed on the number of carbon atoms in these groups. However, it is generally within a range of from 1 to 20, preferably from 1 to 10, more preferably from 1 to 5. X represents a halogen atom. Halogen atoms include fluorine, chlorine, bromine and iodine atoms. The chlorine and bromine atoms are preferred, with the chlorine atom being particularly preferred. n is 0, 1 or 2.

As the polar compound, a compound not impeding polymerization activity may be selected from among water, alcohols, ethers and Lewis acids according to the combination of the transition metal compound and organo-aluminum compound used. For example, when the cobalt salt of an organic acid is used in combination with diethylaluminum chloride, water is useful as the polar compound. The polar substance plays an important role in that the catalytic activity is stably enhanced, and the molecular weight distribution and degree of branching of a polymer formed are adjusted.

No particular limitation is imposed on the polymerization solvent used in the present invention so far as it dissolves the polybutadiene rubber formed and does not adversely affect the activity of the polymerization catalyst. Examples of the polymerization solvent include aromatic hydrocarbons such as benzene, toluene and xylene; alicyclic hydrocarbons such as cyclohexane, methylcyclohexane and cyclopentane; saturated aliphatic hydrocarbons such as n-butane, n-hexane and n-heptane; and unsaturated aliphatic hydrocarbons such as cis-2-butene, trans-2-butene and butene-1. These inert organic solvents may be used either singly or in any combination thereof. The amount of the polymerization solvent used is controlled in such a manner that the concentration of the monomer amounts to a range of generally from 5 to 50 wt. %, preferably from 10 to 40 wt. %.

The molecular weight modifier may be used as needed. Those generally used in the polymerization reaction of cis-1,4-polybutadiene rubber are employed, and allenes such as 1,2-butadiene, and cyclic dienes such as cyclooctadiene are preferably used.

The anti-gelling agent may be used as needed. For example, Lewis bases, carboxylic acid esters and ortho-acid esters are preferably used.

The polymerization reaction of each polybutadiene rubber may be conducted by either a batch process or a continuous process. The polymerization reaction is conducted at a temperature ranging generally from 0 to 100° C., preferably from 10 to 60° C. and under a pressure ranging generally from 0 to 5 atm (gauge pressure). After completion of the reaction, a short stop agent such as an alcohol, an age resistor, an antioxidant, an ultraviolet absorbent, etc. may be added to the reaction mixture. The polymer formed is then washed, isolated and dried in accordance with a method known per se in the art, whereby the intended polybutadiene can be obtained.

In the polybutadiene rubber according to the present invention, both high molecular weight component and low molecular weight component may be produced by polymerization at the same time and then washed, isolated and dried. Alternatively, after the respective components may be separately produced by polymerization, the reaction mixture of the high molecular weight component and the reaction mixture of the low molecular weight component may be blended in a state of solutions, and the resultant blend may be washed, isolated and dried. When the high molecular weight component and the low molecular weight component are separately produced by polymerization, the respective reaction mixtures may be separately washed, isolated and dried. However, it is preferred that both components be blended at a stage that they are in the form of reaction mixtures, since the washing, isolation and drying of the low molecular weight component by itself encounter difficulties on the handling in the preparation of the high-impact aromatic vinyl resin using the polybutadiene rubber according to the present invention in the case where the low molecular weight component is liquid.

The polybutadiene rubber according to the present invention is useful as a modifier for various resins, for example, as an impact modifier.

High-Impact Aromatic Vinyl Resin Composition:

The polybutadiene rubber according to the present invention may be used as an impact modifier (toughening agent) for high-impact aromatic vinyl resin compositions. When the polybutadiene rubber according to the present invention is used as an impact modifier, a high-impact aromatic vinyl resin composition which is well balanced between impact resistance and stiffness, has good low-temperature impact resistance and is prevented from being deteriorated in physical properties by dilution with an aromatic vinyl resin or compounding of various kinds of additives can be obtained.

The polybutadiene rubber according to the present invention may be generally used as an impact modifier by itself. However, it may be used in combination with another rubber so far as no detrimental influence is thereby imposed on the objects of the present invention. Examples of another rubber include low-cis-polybutadiene rubber, styrene-butadiene random copolymer rubber, styrene-butadiene block copolymer rubber, styrene-butadiene tapered block copolymer rubber and styrene-isoprene block copolymer rubber. The amount of these other rubber components used is generally 50 wt. % or less, preferably 40 wt. % or less, more preferably 30 wt. % or less, most preferably 20 wt. % or less based on the weight of the whole rubber component.

The aromatic vinyl resin forming the matrix of the high-impact aromatic vinyl resin composition according to the present invention is generally a homopolymer of an aromatic vinyl monomer or a copolymer of the aromatic vinyl monomer and a monomer copolymerizable therewith. Examples of the aromatic vinyl monomer include styrene, o-methylstyrene, p-methylstyrene, m-methylstyrene, 2,4-dimethylstyrene, ethylstyrene, p-tert-butylstyrene, α-methylstyrene, α-methyl-p-methylstyrene, o-chlorostyrene, m-chlorostyrene, p-chlorostyrene, p-bromostyrene, 2-methyl-1,4-dichlorostyrene, 2,4-dibromostyrene and vinylnaphthalene. Of these, styrene is preferred. These aromatic vinyl monomers may be used either singly or in any combination thereof.

Examples of the monomer copolymerizable with the aromatic vinyl monomer include nitrile monomers such as acrylonitrile, methacrylonitrile and α-chloroacrylo-nitrile; acrylic ester monomers or methacrylic ester monomers such as methyl methacrylate and methyl acrylate; unsaturated fatty acid monomers such as acrylic acid, methacrylic acid and maleic anhydride; and phenylmaleimide. Of these, the nitrile monomers, (meth)acrylic ester monomers and unsaturated fatty acid monomers are preferred, with the nitrile monomers being particularly preferred. These monomers copolymerizable with the aromatic vinyl monomer may be used either singly or in any combination thereof. A proportion of the aromatic vinyl monomer to the monomer copolymerizable with the aromatic vinyl monomer in the aromatic vinyl resin forming the matrix is suitably selected as necessary for the end application intended. However, it is generally within a range of from 20:80 to 100:0, preferably from 40:60 to 100:0, more preferably from 60:40 to 100:0 in terms of a weight ratio of (amount of bound aromatic vinyl monomer):(amount of bound monomer copolymerizable with the aromatic vinyl monomer).

The high-impact resin composition according to the present invention can be obtained by, for example, mechanically mixing the polybutadiene rubber and the aromatic vinyl resin. However, it is generally preferred to prepare it in accordance with a process in which the aromatic vinyl monomer or a mixture of the aromatic vinyl monomer and the monomer copolymerizable therewith is radical-polymerized in the presence of the polybutadiene rubber. No particular limitation is imposed on the preparation process in this case. Examples thereof include a bulk polymerization process, a solution polymerization process, a suspension polymerization process and multi-stage polymerization processes such as a bulk-suspension two-stage polymerization process. Of these, the bulk polymerization process and bulk-suspension two-stage polymerization process are particularly preferred. The bulk polymerization process is preferably a continuous bulk polymerization process.

A proportion of the polybutadiene rubber to the monomer (an aromatic vinyl monomer or a mixture of the aromatic vinyl monomer and a monomer copolymerizable therewith) to be used is suitably selected as necessary for the end application of the resulting high-impact resin composition. However, it is generally within a range of from 1:99 to 40:60, preferably from 2:98 to 30:70, more preferably from 3:97 to 20:80 in terms of a weight ratio of (the polybutadiene):(the monomer).

When the high-impact resin composition is prepared by the continuous bulk polymerization process, the composition is prepared, for example, in accordance with the following process. The polybutadiene is dissolved in the aromatic vinyl monomer or a mixture of the aromatic vinyl monomer and the monomer copolymerizable therewith, and a diluent solvent, an internal lubricant such as liquid paraffin or mineral oil, an antioxidant, a chain transfer agent and the like are added to the solution as needed. Thereafter, in the case of non-catalytic polymerization, polymerization is conducted under heating, generally, at 80 to 200° C., while polymerization is conducted in the presence of a catalyst, generally, at 20 to 200° C. in the case of catalytic polymerization. The polymerization is continued until the conversion of the monomer (the aromatic vinyl monomer or the mixture of the aromatic vinyl monomer and the monomer copolymerizable therewith) into a polymer reaches 60% to 90%. In this case, it is preferred to use the catalyst. After completion of the polymerization process, the high-impact resin composition formed can be collected in accordance with a method known per se in the art, for example, by removing an unreacted monomer and the diluent solvent by solvent removal by heating under reduced pressure, or extrusion by means of an extruder designed so as to remove volatile matter. The thus-obtained high-impact resin composition is optionally pelletized or powdered to put to practical use.

Examples of the diluent solvent include aromatic hydrocarbons such as benzene, toluene, xylene and ethylbenzene; alicyclic hydrocarbons such as cyclohexane, methylcyclohexane and cyclopentane; aliphatic hydrocarbons such as n-butane, n-hexane and n-heptane; and ketones such as methyl isopropyl ketone. The aromatic hydrocarbons are preferred. These diluent solvents may be used either singly or in any combination thereof. The amount of the solvent used is generally 0 to 25 wt. % based on the total weight of the monomer used.

In general, an organic peroxide or azo catalyst is used as the polymerization catalyst. The organic peroxide is preferred. Examples of the organic peroxide include peroxyketals such as 1,1-bis(t-butylperoxy)cyclohexane and 1,1-bis(t-butylperoxy)-3,3,5-trimethylcyclohexane; dialkyl peroxides such as di-t-butyl peroxide and 2,5-dimethyl-2,5-di(t-butylperoxy)hexane; diacyl peroxides such as benzoyl peroxide and m-toluoyl peroxide; peroxydicarbonates such as dimethylstyryl peroxydicarbonate; peroxy esters such as t-butyl peroxyisopropyl carbonate; ketone peroxides such as cyclohexanone peroxide; and hydroperoxides such as p-mentha hydroperoxide. Examples of the azo catalyst include azobisisobutyronitrile. These polymerization catalysts may be used either singly or in any combination thereof. The amount of the polymerization catalyst used is generally 0.001 to 5 parts by weight, preferably 0.005 to 3 parts by weight, more preferably 0.01 to 1 part by weight per 100 parts by weight of the monomer.

Examples of the chain transfer agent include a dimer of α-methylstyrene; mercaptans such as n-dodecyl mercaptan and t-dodecyl mercaptan; terpenes such as 1-phenylbutene-2-fluorene and dipentene; and halogen compounds such as chloroform.

In the case of the bulk-suspension polymerization process, in general, polymerization is partially conducted in the same manner as in the bulk polymerization process until the conversion of the monomer into a polymer reaches 30% to 50%, and a polymerization mixture containing the partially polymerized polymer thus obtained is then suspended in water in the presence of a suspension stabilizer such as polyvinyl alcohol or carboxymethyl cellulose and/or a surfactant such as sodium dodecylbenzenesulfonate to complete the reaction. The high-impact resin composition thus formed is isolated by a method such as separation by filtration or centrifugation, washed with water and dried, and moreover pelletized or powdered as needed.

In the high-impact aromatic vinyl resin composition according to the present invention, the average particle size of the butadiene rubber (hereinafter referred to as "rubber particle diameter") in the resin matrix is generally within a range of from 0.01 to 10 μm, preferably from 0.1 to 5 μm, more preferably from 0.5 to 3 μm. When the rubber particle diameter falls within this range, the resulting resin composition becomes excellent in impact resistance and stiffness, and moreover can be prevented from being deteriorated in impact resistance even when it is diluted with an aromatic vinyl resin or the like or compounded with various kinds of additives.

The high-impact resin composition according to the present invention may be used in a state further diluted with an aromatic vinyl resin. In this case, the amount of the rubber contained in the diluted resin composition is also preferably within a range of from 1 to 40 wt. %, which is substantially the same range as described above.

To the high-impact resin composition according to the present invention, various kinds of additives may be added as needed. Examples of the additives include fatty acids or fatty acid salts such as stearic acid, zinc stearate, magnesium stearate and calcium stearate; organic polysiloxane, mineral oil, antioxidants, stabilizers, ultraviolet absorbents, dyes, pigments, fillers, lubricants, plasticizers, antistatic agents, and flame retardants. The compounding amounts of the various additives may be suitably selected as necessary for the end application intended.

As the flame retardants, halogen-containing flame retardants are preferably used. Various kinds of chlorine- or bromine-containing flame retardants may be used as the halogen-containing flame retardants. Examples of the flame retardants include hexabromobenzene, pentabromoethylbenzene, hexabromobiphenyl, decabromodiphenyl, hexabromodiphenyl oxide, octabromodiphenyl oxide, decabromodiphenyl oxide, pentabromocyclohexane, tetrabromobisphenol A and derivatives thereof [for example, tetrabromobisphenol A-bis (hydroxyethyl ether), tetrabromobisphenol A-bis(2,3-dibromopropyl ether), tetrabromobisphenol A-bis (bromoethyl ether), tetrabromobisphenol A-bis(allyl ether), etc.], tetrabromobisphenol S and derivative thereof [for example, tetrabromobisphenol S-bis(hydroxyethyl ether), tetrabromobisphenol S-bis(2,3-dibromopropyl ether), etc.], tetrabromophthalic anhydride and derivatives thereof [for example, tetrabromophthalimide, ethylenebistetrabromophthalimide, etc.], ethylenebis(5,6-dibromonorbornene-2,3-dicarboxyimide), tris-(2,3-dibromopropyl-1) isocyanurate, adducts of hexachlorocyclopentadiene by Diels-Alder reaction, tribromophenyl glycidyl ether, tribromophenyl acrylate, ethylenebistribromophenyl ether, ethylenebispentabromophenyl ether, tetradecabromodiphenoxybenzene, brominated polystyrene, brominated polyphenylene oxide, brominated epoxy resins, brominated polycarbonate, polypentabromobenzyl acrylate, octabromonaphthalene, hexabromocyclododecane, bis(tribromophenyl)fumaramide and N-methylhexabromodiphenylamine.

Among the flame retardants used in the present invention, particularly preferred flame retardants include such compounds as represented by the following formulae (N1) to (N11):

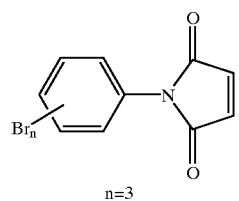

(N1)

n=3

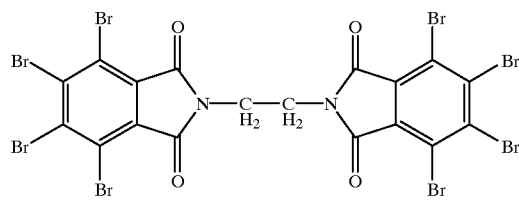

(N2)

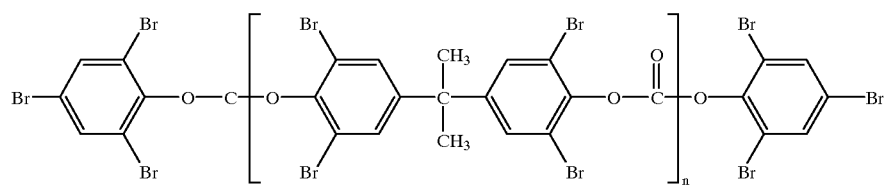

(N3)

(wherein n is 0 or an integer of 1 or greater.)

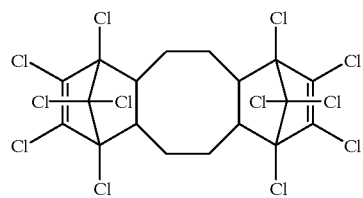

(N4)

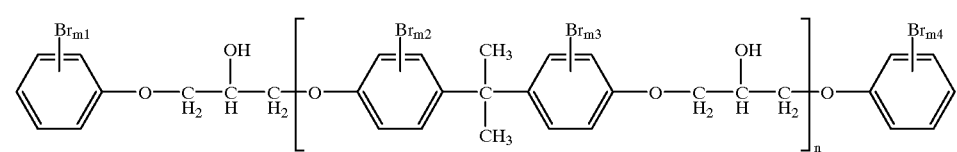

(N5)

(wherein n is 0 or an integer of 1 or greater, and m1 to m4 are independentlyg an integer of 1 or greater, with the proviso that $1 \leq m1 \leq 5$, $1 \leq m2 \leq 4$, $1 \leq m3 \leq 4$ and $1 \leq m4 \leq 5$, preferably $2 \leq m1 \leq 4$, $1 \leq m2 \leq 3$, $2 \leq m3 \leq 3$ and $2 \leq m4 \leq 4$, particularly preferably m1=3, m2=2, m3=2 and m4=3.)

(wherein n is 0 or an integer of 1 or greater, and ml to m6 are independently an integer of 1 or greater, with the proviso that $1 \leq m1 \leq 5$, $1 \leq m2 \leq 5$, $1 \leq m3 \leq 4$, $1m4 \leq 4$, $1 \leq m5 \leq 5$ and $1 \leq m6 \leq 5$, preferably $2 \leq m1 \leq 4$, $2 \leq m2 \leq 4$, $2 \leq m3 \leq 3$, $2 \leq m4 \leq 3$, $2 \leq m5 \leq 3$ and $2 \leq m6 \leq 4$, particularly preferably m1=3, m2=2, m3=2, m4=2, m5=3 and m6=3.)

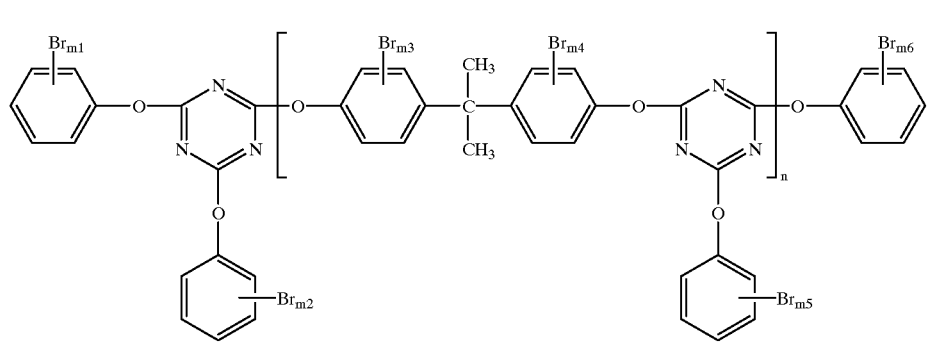

(N6)

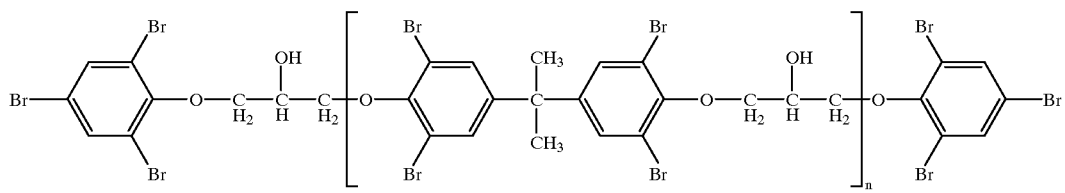
(a specific example of the formula N5)
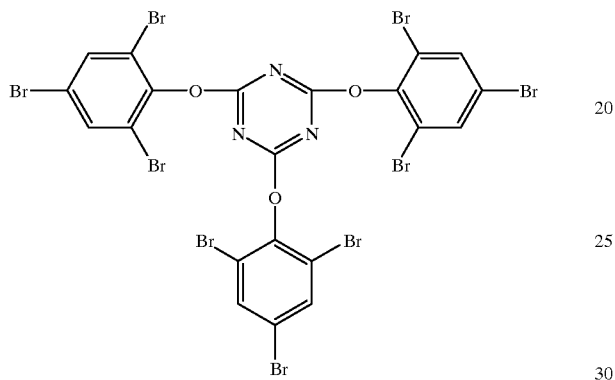
(a specific example of the formula N6)
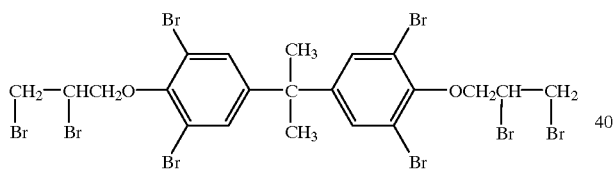
As the flame retardants, there may also be used halogenated bisphenol type epoxy compounds represented by the formula (N10):
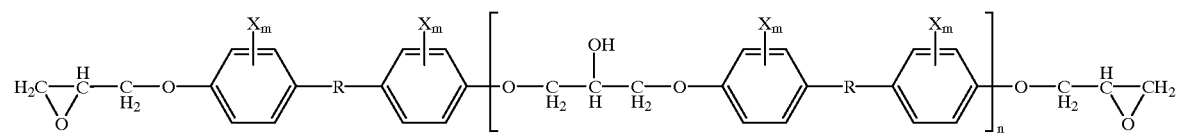
(wherein X is a halogen atom, R is a hydrocarbon group, m is an integer of 1 to 3, and n is 0 or an integer of 1 or greater.)

In the epoxy compounds represented by the formula (N10), a compound in which m is 2, n is substantially 0, the halogen atom X is a bromine atom, and R is an isopropylidene group is preferred. Specific examples of the epoxy compounds represented by the formula (N10) include compounds represented by the formula (N11):

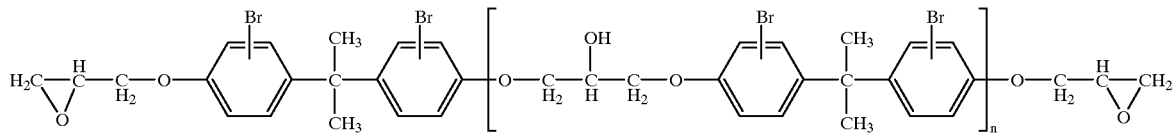

(N11)

As the halogenated bisphenol type epoxy compounds represented by the formula (N11), those having Br contents of 20 wt. % and 50 wt. %, respectively, are commercially-available.

The amount of the flame retardant added is generally 3 to 50 parts by weight per 100 parts by weight of the high-impact resin composition.

As a flame retardant auxiliary for more effectively exhibiting the flameproofing effect of the flame retardant, for example, an antimonial flame retardant auxiliary such as antimony trioxide, antimony pentoxide, sodium antimonate or antimony trichloride may be used. These flame retardant auxiliaries are used in a proportion of generally 1 to 30 parts by weight, preferably 2 to 20 parts by weight per 100 parts by weight of the flame retardant.

Examples of the stabilizers include phenolic antioxidants such as octadecyl-3-(3,5-di-t-butyl-4-hydroxyphenyl) propionate, tetrakis[methylene-3(3,5-di-t-butyl-4-hydroxyphenyl) propionate]methane, alkyl β-(3,5-di-t-butyl-4-hydroxyphenyl)propionates and 2,2'-oxamidobis [ethyl-3(3,5-di-t-butyl-4-hydroxyphenyl) propionate]; and phosphoric stabilizers such as trisnonylphenyl phosphate, tris(2,4-di-t-butylphenyl) phosphite and tris(2,4-di-t-butylphenyl) phosphite.

As the fillers, there may be used various kinds of organic or inorganic powdery, particulate or fibrous fillers. Specific examples of the fillers include silica, diatomaceous earth, alumina, titanium oxide, magnesium oxide, pumice powder, pumice balloon, basic magnesium carbonate, dolomite, calcium sulfate, potassium titanate, barium sulfate, calcium sulfite, talc, clay, mica, asbestos, glass fiber, glass flake, glass beads, calcium silicate, montmorillonite, bentonite, graphite, aluminum powder, molybdenum sulfide, boron fiber, silicon carbide fiber, polyethylene fiber, polypropylene fiber, polyester fiber and polyamide fiber.

EXAMPLES

The present invention will hereinafter be described more specifically by the following Preparation Examples, Examples and Comparative Examples. However, the present invention is not limited to these examples only. All designations of "part" or "parts" and "%" as will be used in the following examples mean part or parts by weight and wt. % unless expressly noted.

Various physical properties were determined in accordance with the following respective methods:
(1) Weight average molecular weight (Mw), number average molecular weight (Mn) and molecular weight distribution (Mw/Mn):

An HLC-8020 gel permeation chromatograph (GPC) manufactured by Tosoh Corp. was used to conduct measurement under the following conditions, thereby calculating out Mw and Mn as values determined in terms of standard polystyrene.

① Column: GMH-XL (manufactured by Tosoh Corp.), 2 columns connected in series.
② Column temperature: 40° C.
③ Eluant: Tetrahydrofuran (THF).
④ Flow rate of eluant: 1.0 ml/min.
⑤ Sample concentration: 8 mg/20 ml (THF solution).
(2) cis-1,4-Bond content:

An IR-700 infrared spectrophotometer manufactured by Japan Spectroscopic Co., Ltd. was used to conduct infrared absorption spectroscopy, thereby calculating out the cis-1,4-bond content by the Morello method.
(3) Intrinsic viscosity [η]:

A polymer sample was dissolved in toluene to measure a viscosity of the solution at 30° C. by means of an Ostwald viscometer.
(4) Izod impact strength:

Measured at 25° C. and −30° C. in accordance with JIS K 7110.
(5) Modulus in flexure Measured in accordance with JIS K 7203.
(6) Rubber particle diameter:

The diameter of rubber particles dispersed in a resin composition sample was determined by staining the resin composition with osmium tetroxide to photograph it through a transmission electron microscope, thereby determining an average particle diameter in accordance with the following equation:

Average particle diameter=(length+breadth)/2.

Preparation Example 1

High Molecular Weight Component (1)

Two 250-liter stainless steel-made polymerization reaction vessel equipped with a stirrer and a reflux condenser were connected in series to conduct continuous polymerization in the following manner.

A mixed solution of toluene/2-butene/1,3-butadiene (10/70/20 wt. %) was fed at a rate of 70 kg/hr to the polymerization reaction vessel. At this time, 1,2-butadiene, trimethyl orthoformate and water were added into a feed pipe at rates of 325 mmol/hr, 5.1 mmol/hr and 96 mmol/hr, respectively. This mixed solution was introduced into the polymerization reaction vessel while further adding diethylaluminum monochloride at a rate of 320 mmol/hr (as a toluene solution) to the mixed solution.

Cobalt octenoate was added at a rate of 9.6 mmol/hr through a feed pipe separate from the feed pipe, through which the above raw mixture was fed, to conduct the continuous polymerization for 48 hours under conditions of 20° C. and residence time of 2 hours. A reaction mixture containing cis-1,4-polybutadiene formed was continuously taken out of the second polymerization reaction vessel, and methanol was added to terminate the polymerization reaction, thereby obtaining polybutadiene as a high molecular weight component (1). The peak top molecular weight of the thus-obtained cis-1,4-polybutadiene was 552,000.

Preparation Example 2
High Molecular Weight Component (2)

A high molecular weight component (2) was obtained in the same manner as in Preparation Example 1 except that the amount of 1,2-butadiene added was changed to 260 mmol/hr. The peak top molecular weight of the thus-obtained cis-1,4-polybutadiene was 601,000.

Preparation Example 3
Low Molecular Weight Component (1)

Two 250-liter stainless steel-made polymerization reaction vessel equipped with a stirrer and a reflux condenser were connected in series to conduct continuous polymerization in the following manner.

A mixed solution of toluene/2-butene/1,3-butadiene (10/70/20 wt. %) was fed at a rate of 70 kg/hr to the polymerization reaction vessel. At this time, 1,2-butadiene and water were added into a feed pipe at rates of 130 mmol/hr and 145 mmol/hr, respectively. This mixed solution was introduced into the polymerization reaction vessel while further adding diethylaluminum monochloride at a rate of 291 mmol/hr (as a toluene solution) to the mixed solution.

Nickel naphthenate was added at a rate of 6 mmol/hr through a feed pipe separate from the feed pipe, through which the above raw mixture was fed, to conduct the continuous polymerization for 24 hours under conditions of 20° C. and residence time of 2 hours. A reaction mixture containing cis-1,4-polybutadiene formed was continuously taken out of the second polymerization reaction vessel, and methanol was added to terminate the polymerization reaction, thereby obtaining polybutadiene as a low molecular weight component (1). The peak top molecular weight of the thus-obtained cis-1,4-polybutadiene was 22,500.

Preparation Example 4
Low Molecular Weight Component (2)

A low molecular weight component (2) was obtained in the same manner as in Preparation Example 3 except that the amount of water added was changed to 116 mmol/hr. The peak top molecular weight of the thus-obtained cis-1,4-polybutadiene was 16,200.

Preparation Example 5
Low Molecular Weight Component (3)

A low molecular weight component (3) was obtained in the same manner as in Preparation Example 2 except that the amount of 1,2-butadiene added was changed to 1037 mmol/hr. The peak top molecular weight of the thus-obtained cis-1,4-polybutadiene was 205,000.

Example 1

The reaction mixture containing the high molecular weight component (1) obtained in Preparation Example 1 and the reaction mixture containing the low molecular weight component (1) obtained in Preparation Example 3 were blended so as to give a weight ratio of 70:30 in terms of polymer. Thereafter, 0.2 phr of octadecyl-3-(3,5-di-t-butyl-4-hydroxyphenyl) propionate and 0.4 phr of tris-nonylphenyl phosphate (TNP) were added as an age resistor to the blend to conduct steam stripping of the blend. The thus-treated blend was then dehydrated and dried by an extrusion dryer to obtain Sample (A) of polybutadiene rubber. The measurement results of Sample (A) are shown in Table 1.

Example 2

The reaction mixture containing the high molecular weight component (1) obtained in Preparation Example 1 and the reaction mixture containing the low molecular weight component (2) obtained in Preparation Example 4 were blended so as to give a weight ratio of 80:20 in terms of polymer. The blend was subjected to an after-treatment in the same manner as in Example 1 to obtain Sample (B) of polybutadiene rubber. The measurement results of Sample (B) are shown in Table 1.

Example 3

The reaction mixture containing the high molecular weight component (1) obtained in Preparation Example 1 and the reaction mixture containing the low molecular weight component (2) obtained in Preparation Example 4 were blended so as to give a weight ratio of 60:40 in terms of polymer. The blend was subjected to an after-treatment in the same manner as in Example 1 to obtain Sample (C) of polybutadiene rubber. The measurement results of Sample (C) are shown in Table 1.

Comparative Example 1

The reaction mixture containing the high molecular weight component (2) obtained in Preparation Example 2 and the reaction mixture containing the low molecular weight component (3) obtained in Preparation Example 5 were blended so as to give a weight ratio of 70:30 in terms of polymer. The blend was subjected to an after-treatment in the same manner as in Example 1 to obtain Sample (D) of polybutadiene rubber. The measurement results of Sample (D) are shown in Table 1.

Comparative Example 2

The reaction mixture containing the high molecular weight component (2) obtained in Preparation Example 2 and the reaction mixture containing the low molecular weight component (3) obtained in Preparation Example 5 were blended so as to give a weight ratio of 60:40 in terms of polymer. The blend was subjected to an after-treatment in the same manner as in Example 1 to obtain Sample (E) of polybutadiene rubber. The measurement results of Sample (E) are shown in Table 1.

Comparative Example 3

The reaction mixture containing the high molecular weight component (1) obtained in Preparation Example 1 was used to conduct an after-treatment in the same manner as in Example 1, thereby obtaining Sample (F) of polybutadiene rubber. The measurement results of Sample (F) are shown in Table 1.

TABLE 1

| | Example | | | Comp. Example | | |
|---|---|---|---|---|---|---|
| | 1 | 2 | 3 | 1 | 2 | 3 |
| Kind of rubber | A | B | C | D | E | F |
| High molecular weight component/low molecular weight component (wt. %) | 70/30 | 80/20 | 60/40 | 70/30 | 60/40 | 100/0 |
| cis-1,4-Bond content (wt. %) | 93.7 | 94.5 | 92.8 | 94.6 | 93.8 | 96.7 |
| 1,2-Vinyl bond content (wt. %) | 2.5 | 2.2 | 2.7 | 2.6 | 2.6 | 1.7 |

TABLE 1-continued

| | Example | | | Comp. Example | | |
|---|---|---|---|---|---|---|
| | 1 | 2 | 3 | 1 | 2 | 3 |
| Peak top molecular weight of high molecular weight component ($\times 10^4$) | 55.2 | 55.2 | 55.2 | 60.1 | 60.1 | 55.2 |
| Peak top molecular weight of low molecular weight component ($\times 10^4$) | 2.25 | 1.62 | 1.62 | 20.5 | 20.5 | — |
| High molecular weight component/low molecular weight component as determined by GPC (area ratio) | 78/22 | 88/12 | 68/32 | — | 55/45 | — |
| Intrinsic viscosity [η] | 2.46 | 2.63 | 2.15 | 3.84 | 2.41 | 3.00 |
| molecular weight distribution (Mw/Mn) | 10.16 | 9.46 | 12.06 | 3.34 | 3.98 | 2.85 |
| Number of peaks | 2 | 2 | 2 | 1 | 2 | 1 |

TABLE 2

| | Example | | | Comp. Example | | |
|---|---|---|---|---|---|---|
| | 4 | 5 | 6 | 4 | 5 | 6 |
| Kind of polymer | A | B | C | D | E | F |
| Rubber content (wt. %) | 10 | 9 | 9 | 9 | 10 | 11 |
| Izod impact strength (kg.cm/cm) | | | | | | |
| 25° C. | 16.2 | 15.6 | 15.0 | 8.7 | 13.1 | 8.8 |
| −30° C. | 12.8 | 11.7 | 11.5 | 6.6 | 9.5 | 5.5 |
| Modulus in flexure (kg/cm$^2$) | 22000 | 21000 | 21000 | 18000 | 20000 | 18000 |
| Rubber particle diameter (μm) | 1.1 | 1.0 | 0.9 | 1.0 | 1.1 | 0.9 |

Example 4

After 180 g of Sample (A) of polybutadiene rubber obtained in Example 1 were dissolved in 1,820 g of a styrene monomer in a stainless steel-made reactor equipped with a stirring machine, a chain transfer agent (n-dodecyl mercaptan) was added in a proportion of 250 ppm based on the styrene monomer. The resultant mixture was stirred at 130° C. for 1 hour and 20 minutes to conduct bulk polymerization.

The contents were then taken out of the reactor. A 8-liter stainless steel-made reactor equipped with a stirring machine was charged with 1,250 g of the contents and 3,750 g of a 2% aqueous solution of polyvinyl alcohol, and the resultant mixture was heated to 70° C. Then, 2.5 g of benzoyl peroxide and 1.26 g of dicumyl peroxide were added to conduct suspension polymerization for 1 hour at 70° C., for 1 hour at 90° C., for 1 hour at 110° C. and for 4 hours at 130° C. After completion of the polymerization, the reaction mixture was cooled down to room temperature, and the resultant high-impact polystyrene resin was collected by filtration, washed with water and then dried under reduced pressure at 60° C. for 6 hours.

The high-impact polystyrene resin thus obtained was kneaded by rolls heated to 180° C. and formed into a sheet. The sheet was cut into pellets by means of a pelletizer for sheet. The thus-obtained pellets were injection-molded by means of an injection molding machine to produce a test specimen. The measurement results of the test specimen as to Izod impact strength, modulus in flexure and rubber particle diameter are shown in Table 2.

Examples 5 and 6, and Comparative Examples 4 to 6

Test samples were produced in the same manner as in Example 4 except that Samples B to F of polybutadiene rubber obtained in Examples 2 and 3, and Comparative Examples 1 to 3 were respectively used. The measurement results of the test specimens as to Izod impact strength, modulus in flexure and rubber particle diameter are shown in Table 2.

Examples 7 to 9 and Comparative Examples 7 to 9

The respective resin compositions obtained in Examples 4 to 6 and Comparative Examples 4 to 6 were separately diluted with a polystyrene resin (Styron 666, product of Asahi Chemical Industry Co., Ltd.) so as to give their corresponding rubber contents shown in Table 3. The dilution of the resin compositions was conducted by using a twin-screw, same-direction extruder, 2D25F2 Model, manufactured by Toyo Seiki Seisaku-Sho, Ltd. to melt and knead each of the resin compositions and the polystyrene resin. The results are shown in Table 3.

TABLE 3

| | Example | | | Comp. Example | | |
|---|---|---|---|---|---|---|
| | 7 | 8 | 9 | 7 | 8 | 9 |
| Kind of polymer | A | B | C | D | E | F |
| Rubber content after dilution (wt. %) | 5 | 6 | 5 | 5 | 6 | 6 |
| Izod impact strength (25° C.) (kg.cm/cm) | 13.2 | 12.7 | 12.2 | 5.6 | 7.8 | 5.6 |
| Modulus in flexure (kg/cm$^2$) | 25000 | 25000 | 24000 | 24000 | 23000 | 24000 |

INDUSTRIAL APPLICABILITY

According to the present invention, there are provided high-impact aromatic vinyl resin compositions which are well balanced between impact resistance and stiffness, have good low-temperature impact strength and are prevented from being deteriorated in physical properties such as impact resistance even when they are diluted with an aromatic vinyl resin or the like or compounded with various kinds of additives, a preparation process thereof, and novel polybutadiene rubber which permits the provision of such a resin composition. The high-impact resin compositions according to the present invention can be suitably used in application fields of which impact resistance and stiffness, particularly, low-temperature impact strength is required.

What is claimed is:

1. Polybutadiene rubber wherein a molecular weight distribution curve of the rubber as determined by gel permeation chromatography (GPC) has 2 peaks attributable to a high molecular weight component and a low molecular weight component, a peak top molecular weight of the high molecular weight component and a peak top molecular weight of the low molecular weight component fall within ranges of from 100,000 to 1,500,000 and from 10,000 to 50,000, respectively, a ratio of the weight average molecular weight (Mw) to the number average molecular weight (Mn), Mw/Mn, falls within a range of from 4.5 to 14.5, and the content of a cis-1,4 structure is at least 80 wt. %.

2. The polybutadiene rubber according to claim 1, wherein the peak top molecular weight of the high molecular weight component falls within a range of from 300,000 to 800,000.

3. The polybutadiene rubber according to claim 1 or 2, wherein the peak top molecular weight of the low molecular weight component falls within a range of from 15,000 to 30,000.

4. The polybutadiene rubber according to claim 1 or 2, wherein the molecular weight distribution (Mw/Mn) of the polybutadiene rubber falls within a range of from 8.0 to 13.0.

5. The polybutadiene rubber according to claim 1 or 2, wherein the content of the cis-1,4 structure is at least 90 wt. %.

6. The polybutadiene rubber according to claim 1 or 2, wherein the 1,2-vinyl bond content in the rubber falls within a range of from 1 to 10 wt. %.

7. The polybutadiene rubber according to claim 1 or 2, wherein the intrinsic viscosity [η] of the rubber as measured at 30° C. in a toluene solution falls within a range of from 1.0 to 6.0.

8. The polybutadiene rubber according to claim 1 or 2, wherein the intrinsic viscosity [η] of the rubber as measured at 30° C. in a toluene solution falls within a range of from 2.0 to 3.0.

9. The polybutadiene rubber according to claim 1 or 2, which contains 30 to 98 wt. % of the high molecular weight component and 2 to 70 wt. % of the low molecular weight component.

10. The polybutadiene rubber according to claim 1 or 2, which contains 50 to 95 wt. % of the high molecular weight component and 5 to 50 wt. % of the low molecular weight component.

11. A process for preparing polybutadiene rubber wherein a molecular weight distribution curve of the rubber as determined by gel permeation chromatography (GPC) has 2 peaks attributable to a high molecular weight component and a low molecular weight component, a peak top molecular weight of the high molecular weight component and a peak top molecular weight of the low molecular weight component fall within ranges of from 100,000 to 1,500,000 and from 10,000 to 50,000, respectively, a ratio of the weight average molecular weight (Mw) to the number average molecular weight (Mn), Mw/Mn, falls within a range of from 4.5 to 14.5, and the content of a cis-1,4 structure is at least 80 wt. %, the process comprising the step of blending high molecular weight polybutadiene, in which the peak top molecular weight as determined by GPC falls within a range of from 100,000 to 1,500,000, with low molecular weight polybutadiene, in which the peak top molecular weight falls within a range of from 10,000 to 50,000, in a state of solutions.

12. The preparation process according to claim 11, which comprises the step of blending 30 to 98 wt. % of the high molecular weight polybutadiene with 2 to 70 wt. % of the low molecular weight polybutadiene in a state of solutions.

13. A modifier for resins, comprising, as an active ingredient, polybutadiene rubber wherein a molecular weight distribution curve of the rubber as determined by gel permeation chromatography (GPC) has 2 peaks attributable to a high molecular weight component and a low molecular weight component, a peak top molecular weight of the high molecular weight component and a peak top molecular weight of the low molecular weight component fall within ranges of from 100,000 to 1,500,000 and from 10,000 to 50,000, respectively, a ratio of the weight average molecular weight (Mw) to the number average molecular weight (Mn), Mw/Mn, falls within a range of from 4.5 to 14.5, and the content of a cis-1,4 structure is at least 80 wt. %.

14. A process for preparing a high-impact aromatic vinyl resin composition, which comprises radical-polymerizing 99 to 60 wt. % of (B) an aromatic vinyl monomer or a mixture of the aromatic vinyl monomer and a monomer copolymerizable therewith in the presence of 1 to 40 wt. % of (A) polybutadiene rubber wherein a molecular weight distribution curve of the rubber as determined by gel permeation chromatography (GPC) has 2 peaks attributable to a high molecular weight component and a low molecular weight component, a peak top molecular weight of the high molecular weight component and a peak top molecular weight of the low molecular weight component fall within ranges of from 100,000 to 1,500,000 and from 10,000 to 50,000, respectively, a ratio of the weight average molecular weight (Mw) to the number average molecular weight (Mn), Mw/Mn, falls within a range of from 4.5 to.14.5, and the content of a cis-1,4 structure is at least 80 wt. %.

15. The preparation process according to claim 14, wherein (A) the polybutadiene rubber contains 30 to 98 wt. % of the high molecular weight component and 2 to 70 wt. % of the low molecular weight component.

16. The preparation process according to claim 14 or 15, wherein the radical polymerization is conducted by a bulk polymerization process.

17. The preparation process according to claim 14 or 15, wherein the radical polymerization is conducted by a bulk-suspension polymerization process.

18. The preparation process according to claim 14 or 15, which further comprises the step of diluting the reaction product with an aromatic vinyl resin after the radical polymerization.

19. A high-impact aromatic vinyl resin composition having a structure that polybutadiene rubber is dispersed in a matrix of an aromatic vinyl resin, wherein:

(a) the polybutadiene rubber is polybutadiene rubber wherein a molecular weight distribution curve of the rubber as determined by gel permeation chromatography (GPC) has 2 peaks attributable to a high molecular weight component and a low molecular weight component, a peak top molecular weight of the high molecular weight component and a peak top molecular weight of the low molecular weight component fall within ranges of from 100,000 to 1,500,000 and from 10,000 to 50,000, respectively, a ratio of the weight average molecular weight (Mw) to the number average molecular weight (Mn), Mw/Mn, falls within a range of from 4.5 to 14.5, and the content of a cis-1,4 structure is at least 80 wt. %, (b) the aromatic vinyl resin is at least one selected from the group consisting of polymers of aromatic vinyl monomers and copolymers of an aromatic vinyl monomer and a monomer copolymerizable therewith, (c) proportions of the polybutadiene rubber and the aromatic vinyl resin are 1 to 40 wt. % and 99 to 60 wt. %, respectively, and (d) the polybutadiene rubber is dispersed in the form of rubber particles having an average particle diameter ranging from 0.01 to 10 μm in the aromatic vinyl resin.

20. The resin composition according to claim 19, wherein the polybutadiene rubber contains 30 to 98 wt. % of the high molecular weight component and 2 to 70 wt. % of the low molecular weight component.

21. The resin composition according to claim 19 or 20, wherein the polybutadiene rubber is dispersed in the form of rubber particles having an average particle diameter ranging from 0.5 to 3 μm in the aromatic vinyl resin.

* * * * *